UNITED STATES PATENT OFFICE.

HUGO WOLFF AND FILIP KAČER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRACENE DYES AND PROCESS OF MAKING THEM.

1,266,896. Specification of Letters Patent. Patented May 21, 1918.

No Drawing. Application filed December 4, 1913. Serial No. 804,731.

*To all whom it may concern:*

Be it known that we, HUGO WOLFF and FILIP KAČER, citizens of the German Empire, residing at Mannheim, Germany, have invented new and useful Improvements in Anthracene Dyes and Processes of Making Them, of which the following is a specification.

We have found that the intermediate products obtainable from 1-acetyl-amino-anthraquinone bodies, under which term we include 1-acetyl-amino-anthraquinone or a derivative thereof or mixture of these compounds with one another or with other acetyl-amino-anthraquinones, by treatment with an acid chlorid as described, for instance in Letters Patent Nos. 863,401 and 925,917, can, by treating at temperature of at least about 140° C. with a compound capable of extracting the elements of water, be converted into new products which constitute vat coloring matters and dye vegetable fiber generally strong yellow-brown to deep red-brown shades of excellent fastness. For the purpose of extracting the elements of water according to our invention, concentrated sulfuric acid is especially suitable. The said intermediate products can also be converted into the new vat coloring matters by a more energetic treatment with acid chlorid than that described in the specifications of the aforesaid patents, that is to say, the new vat coloring matters can be prepared by subjecting one, or several, of the said 1-acetyl-amino-anthraquinone compounds to a prolonged treatment with an acid chlorid, employing if necessary a higher temperature, so that the dehydration takes place. Further, if desired, the production of the acetyl-amino-anthraquinone from the amino-anthraquinone and acetic anhydrid, acetyl chlorid, or sodium acetate, can be carried out at the same time.

Our new compounds are characterized by the following properties: They consist, when dry, of from yellow-brown to red powders which are insoluble in water and in dilute alkalis, they yield from red-brown to red solutions in concentrated sulfuric acid and brown solutions in boiling glacial acetic acid and nitrobenzene; with alkaline hydrosulfite they give rise to from yellow-red to red-brown vats which dye cotton from reddish brown to yellowish brown shades, which shades upon treatment with a neutral solution of sodium hydrosulfite remain unchanged.

The following examples will serve to illustrate further the nature of our invention, but the invention is not confined to these examples. The parts are by weight:

Example 1.

Heat together, for from 1 to 2 hours, at about from 140° to 160° C., one hundred and fifty parts of concentrated sulfuric acid and 10 parts of the condensation product obtainable from 1-acetyl-amino-anthraquinone and phosphorus oxychlorid by boiling until a yellow crystalline mass is obtained, then treating the mass with water and filtering off the product and drying it (see Example 1 of Patent No. 863,401). When the mixture is cold, pour it into water, raise to the boil, filter, wash while hot and, if desired, extract the coloring matter with boiling dilute sodium carbonate solution. The coloring matter thus obtained consists of a dark red paste which is insoluble in dilute acids and alkalis. It gives a red-brown solution in concentrated sulfuric acid and a brown solution in boiling glacial acetic acid or nitrobenzene. It yields a red-brown vat with alkaline hydrosulfite solution and dyes cotton reddish brown shades of excellent fastness.

On treating, in a similar manner, the product obtained from a mixture of 67 parts of 1-acetyl-amino-anthraquinone and 100 parts of diacetyl-di-amino-anthraquinone (obtainable by reducing and then acetylating the α-dinitro-anthraquinone described in the specification of German Patent 72685) by boiling with 334 parts of phosphorus oxychlorid during about ten minutes a product is obtained which appears very similar to that obtained as above described.

Example 2.

Treat, in the manner described in the foregoing example the condensation product obtained by boiling together, for about ten minutes, in a reflux apparatus, one part of 1-acetyl-amino-anthraquinone, one part of 2-acetyl-amino-anthraquinone and four parts of phosphorus oxychlorid, then treating with water, filtering, washing and drying.

The product obtained by treating this body with sulfuric acid in the aforesaid manner, consists of a yellow-brown powder which yields a red solution in concentrated sulfuric acid and a brown-yellow solution in solvents of high boiling point. It gives a yellow-red vat which dyes cotton yellow-red shades which, upon washing and drying, become brown with a yellow tinge.

In a similar manner, coloring matter can be obtained from other condensation products of 1-acetyl-amino-anthraquinones described in the specifications of the Patents 863,401 and 925,917.

Instead of separating the condensation products obtainable by treatment of 1-acetyl-amino-anthraquinone with acid chlorid, the crude reaction mass can according to the present invention be immediately employed for the production of further condensation products.

*Example 3.*

Treat a mixture of 1-acetyl-amino-anthraquinone and diacetyl-amino-anthraquinone with phosphorus oxychlorid as described above at the end of Example 1 and then subject the mixture to a more energetic treatment than described in Example 4 of the specification of Patent 925,917, for instance heat it for about 3 hours at from 140° to 150° C. Then work up the mass as described in the foregoing Example 1. The coloring matter obtained dyes cotton, from a vat, brown shades, whereas the product of the aforesaid Example 4 of Patent No. 925,917 yields orange-red shades.

Now what we claim is:—

1. The process of producing coloring matters of the anthracene series by treating, at a temperature of at least about 140° C., with a compound capable of extracting the elements of water, an intermediate product obtainable from a 1-acetyl-amino-anthraquinone by treatment with an acid chlorid.

2. The process of producing coloring matters of the anthracene series by treating, at a temperature of at least about 140° C., with a compound capable of extracting the elements of water, an intermediate product obtainable from a plurality of acetylated amino-anthraquinone compounds containing a 1-acetyl-amino-anthraquinone body by treatment with an acid chlorid.

3. The process of producing coloring matters of the anthracene series, by treating with sulfuric acid, at a temperature of at least about 140° C., the product obtainable by boiling 1-acetyl-amino-anthraquinone with phosphorus oxychlorid, washing the product with water and drying it.

4. The new vat coloring matter obtainable by extracting the elements of water from the intermediate products obtainable from a 1-acetyl-amino-anthraquinone body and an acid chlorid, which new vat coloring matters consist, when dry, of from yellow-brown to red powders which are insoluble in water and in dilute alkalis, which yield from red-brown to red solutions in concentrated sulfuric acid and brown solutions in boiling glacial acetic acid and nitrobenzene, which give rise with alkaline hydrosulfite to form yellow-red to red-brown vats which dye cotton from reddish brown to yellowish brown shades, which shades upon treatment with a neutral solution of sodium hydrosulfite remain unchanged.

5. The new vat coloring matter obtainable by extracting the elements of water from the intermediate products obtainable from 1-acetyl-amino-anthraquinone and phosphorus oxychlorid, which new vat coloring matter consists when dry of a red powder which is insoluble in water and in dilute alkalis, which yields a red-brown solution in concentrated sulfuric acid and a brown solution in boiling glacial acetic acid or nitrobenzene, and which yields a red-brown vat with alkaline hydrosulfite solution and dyes cotton reddish brown shades, which shades, on treatment with neutral sodium hydrosulfite solution, remain unchanged.

In testimony whereof we have hereunto set our hands in the presence of two subscribing witnesses.

HUGO WOLFF.
FILIP KAČER.

Witnesses:
J. ALEC LLOYD,
S. S. BERGER.